(12) United States Patent
Walitzki et al.

(10) Patent No.: US 9,233,752 B2
(45) Date of Patent: Jan. 12, 2016

(54) DRIVE SYSTEM WITH HARMONIC DRIVE FOR SELF-PROPELLED AIRCRAFT WHEEL

(75) Inventors: Hans Walitzki, Portland, OR (US); Jonathan Edelson, Portland, OR (US); Rodney T. Cox, North Plains, OR (US); Isaiah W. Cox, Baltimore, MD (US)

(73) Assignee: Borealis Technical Limited, Gibraltar (GI)

( * ) Notice: Subject to any disclaimer, the term of this patent is extended or adjusted under 35 U.S.C. 154(b) by 188 days.

(21) Appl. No.: 13/561,066

(22) Filed: Jul. 29, 2012

(65) Prior Publication Data

US 2013/0112806 A1    May 9, 2013

Related U.S. Application Data

(60) Provisional application No. 61/513,446, filed on Jul. 29, 2011.

(51) Int. Cl.
*B64C 25/50* (2006.01)
*B64C 25/40* (2006.01)

(52) U.S. Cl.
CPC ............ *B64C 25/405* (2013.01); *Y02T 50/823* (2013.01)

(58) Field of Classification Search
CPC ............................ B64C 25/405; Y02T 50/823
See application file for complete search history.

(56) References Cited

U.S. PATENT DOCUMENTS

| | | | |
|---|---|---|---|
| 2,430,163 A | 11/1974 | Dever | |
| 3,874,619 A * | 4/1975 | Collins | B64C 25/405 180/7.1 |
| 3,977,631 A | 8/1976 | Jenny | |
| 6,657,334 B1 | 12/2003 | Edelson | |
| 6,838,791 B2 | 1/2005 | Edelson | |
| 7,116,019 B2 | 10/2006 | Edelson | |
| 7,226,018 B2 | 6/2007 | Sullivan | |
| 7,445,178 B2 | 11/2008 | McCoskey et al. | |
| 7,469,858 B2 | 12/2008 | Edelson | |
| 2007/0158497 A1* | 7/2007 | Edelson | B64C 25/405 244/103 S |
| 2009/0114765 A1* | 5/2009 | Cox et al. | 244/50 |
| 2009/0261197 A1* | 10/2009 | Cox | B64C 25/36 244/50 |
| 2009/0294577 A1* | 12/2009 | Roques | B64C 25/40 244/50 |
| 2009/0294578 A1 | 12/2009 | Humphrey | |
| 2011/0156472 A1* | 6/2011 | Bucheton et al. | 301/6.2 |
| 2012/0018574 A1* | 1/2012 | Bayer | 244/50 |
| 2012/0153075 A1* | 6/2012 | Wilson | B64C 25/405 244/50 |
| 2014/0187370 A1* | 7/2014 | Walsh | F16H 7/0827 474/121 |
| 2014/0225421 A1* | 8/2014 | Oswald | B64C 25/405 301/6.2 |

FOREIGN PATENT DOCUMENTS

GB    2453027 A1    3/2009

\* cited by examiner

*Primary Examiner* — Christopher P Ellis
*Assistant Examiner* — George Andonyan

(57) ABSTRACT

A drive system with harmonic drive designed to meet the high power and torque requirements required to drive an aircraft independently on the ground is provided. The drive system includes an electric motor driven by a harmonic drive assembly that may be configured to be integral with the motor. This drive system with harmonic drive can be effectively installed in an existing aircraft nose wheel or main wheel without changes to other components.

16 Claims, 2 Drawing Sheets

DRIVE SYSTEM WITH HARMONIC DRIVE FOR SELF-PROPELLED AIRCRAFT WHEEL

PRIORITY CLAIM

This application claims priority from U.S. Provisional Patent Application No. 61/513,446, filed Jul. 29, 2011, the disclosure of which is fully incorporated herein.

TECHNICAL FIELD

The present invention relates generally to drive systems for aircraft wheels and specifically to a drive system for independently driving an aircraft wheel on the ground that incorporates harmonic drive.

BACKGROUND OF THE INVENTION

As air travel has increased over the past decades, airport facilities have become more crowded and congested. Minimizing the time between the arrival of an aircraft and its departure to maintain an airline's flight schedule, and also to make a gate or parking location available without delay to an incoming aircraft, has become an airline priority. The safe and efficient ground movement of a large number of aircraft simultaneously into and out of the ramp and gate areas has become increasingly important. As airline fuel costs and safety concerns and regulations have increased, use of the aircraft main engines is no longer the best option for achieving the desired safe and efficient ground movement.

Various alternatives to the use of an aircraft's main engines to move an aircraft on the ground have been tried. The use of a tug or tow vehicle to move an aircraft into and out of a gate or parking location can eliminate the need to use the aircraft main engines. This option, however, is not without its own challenges and costs. More ground vehicles, requiring more fuel and more ground personnel to operate them, add to an already congested environment in the gate area. Restricted use of the aircraft engines on low power during arrival at or departure from a gate is an additional option. This option is also problematic, however. Not only are the engines designed to operate at high speeds at altitude and not to drive the aircraft on the ground at under 30 miles per hour, they consume very large amounts of fuel on the ground. The engines are also noisy, and the associated safety hazards of jet blast and engine ingestion in a congested area are significant concerns that cannot be overlooked.

The use of a motor structure integrally mounted with a wheel to rotate the wheel and drive an aircraft has been proposed. The use of such a structure, ideally, should move an aircraft with no or, at most minimal, use of an aircraft's main engines or the external assistance of tow vehicles. In U.S. Pat. No. 2,430,163, for example, Dever describes a motor that may be incorporated in an aircraft landing gear wheel, but does not suggest integrating any type of gearing or similar drive structures with this wheel motor. U.S. Pat. No. 3,977,631 to Jenny describes a motor assembly selectively coupled to an aircraft wheel that includes a conventional reduction gear assembly, but there is no suggestion that any other kind of motor drive structure could be employed. U.S. Pat. No. 7,445,178 to McCoskey et al and U.S. Pat. No. 7,226,018 to Sullivan describe, respectively, a powered nose aircraft wheel system with a multifunctional wheel motor driven by a planetary gear assembly or a direct drive and an aircraft wheel hub motor/generator with a stack of alternating rotor and stator disks, in which the rotors are coupled to the wheel. None of the aforementioned patents suggests motor drive or gearing systems useful for producing aircraft self-propelled ground movement other than those disclosed, which are the traditional gear arrangements conventionally used to drive motors.

Conventional gearing, such as the planetary and other gear systems described the patents discussed above, is only one possible option for driving an electric motor. Other drive systems include, for example, strain wave gearing, known as harmonic drive. Harmonic drive is a special type of mechanical gear system based on elastic dynamics utilizing the flexibility of metal that produces improvements over traditional gear arrangements, including helical and planetary gearing. A type of harmonic gearing is shown and discussed in UK Patent Application Publication No. GB 2453027, owned by the assignee of the present invention. The application of the harmonic gearing arrangement described therein is not discussed, and there is no suggestion that it could be used to drive motor components in an aircraft drive wheel.

U.S. Pat. No. 7,469,858 to Edelson, owned in common with the present invention, describes a gear system for an aircraft wheel motor that provides the necessary torque with reasonable system mass and a mechanism for automatically decoupling the high gear ratio needed to drive the load from the load if the load overhauls. While the aforementioned gearing system is described to be located in or near a drive wheel, it is not suggested that the gearing could be replaced by harmonic drive or any other type of gearing U.S. Patent Application Publication No. US2009/0294578 to Humphrey describes the use of harmonic drive in an aircraft landing gear steering system, in which a turning member is coupled to a landing gear leg through a harmonic drive mechanism. Humphrey is completely silent, however, with respect to whether the aircraft landing gear wheels are powered or otherwise driven by a drive motor or any other power source and does not mention the application of harmonic drive to drive aircraft wheels.

None of the foregoing art suggests a drive system capable of powering an aircraft drive wheel during ground travel that includes harmonic drive. This art, moreover, does not contemplate a wheel drive system with harmonic drive that can be installed or retrofitted in existing aircraft without the modification of other landing gear structures.

A need exists, therefore, for an aircraft wheel drive system including a drive motor with harmonic drive capable of generating optimum torque for driving any aircraft wheel and, thus, the aircraft during ground travel. A need further exists for a harmonic drive system for any aircraft drive wheel specifically configured to drive a motor mounted on the aircraft drive wheel to move the aircraft on the ground independently of aircraft engines or tow vehicles.

SUMMARY OF THE INVENTION

It is a primary object of the present invention, therefore, to overcome the disadvantages of the prior art and to provide an aircraft wheel drive system including a drive motor with harmonic drive capable of generating optimum torque for driving any aircraft wheel and, thus, the aircraft during ground travel.

It is another object of the present invention to provide a powered aircraft drive motor and a harmonic drive assembly configured integrally with the motor for any aircraft wheel.

It is another object of the present invention to provide a powered aircraft wheel drive motor with harmonic drive that is compact and lightweight for any aircraft wheel.

It is an additional object of the present invention to provide a powered aircraft drive wheel with harmonic drive that produces high gear reduction ratios for any aircraft wheel.

It is a further object of the present invention to provide a drive motor with harmonic drive for any self-propelled aircraft wheel capable of producing a higher gear ratio within a small volume than is possible with planetary gears.

It is yet another object of the present invention to provide a compact drive system with integral harmonic drive for any aircraft drive wheel that can be installed on existing aircraft without replacement of the aircraft's axle, wheel, tire, piston, or other landing gear components.

In accordance with the aforesaid objects, a drive system for any aircraft drive wheel is provided that effectively generates the torques required to drive the wheel and the aircraft on the ground. The drive system includes a motor assembly configured with a rotor element and a stator element and harmonic drive components integrally mounted in driving relationship with the motor components. The motor assembly components and harmonic drive components are configured and sized to fit substantially completely and operationally within the space defined by the interior structures of the aircraft wheel. The drive system with harmonic drive of the present invention is designed to be installed on existing aircraft landing gear wheels, including both nose wheels and main wheels, without requiring replacement of existing landing gear components.

Other objects and advantages will be apparent from the following description, claims, and drawings.

DESCRIPTION OF THE INVENTION

The many advantages of being able to drive an aircraft on the ground independently without using the aircraft main engines, as discussed above, have been acknowledged. Providing a drive system capable of effectively producing the operating torques required to drive any aircraft wheel to move an aircraft on the ground must be achieved for this to be a viable option. The present invention employs a compact electric motor in combination with an integral harmonic drive arrangement that enhances these advantages to produce a more compact, lightweight aircraft wheel drive system with higher gear ratios than has heretofore been available. The drive system with harmonic drive of the present invention, moreover, is designed to be installed in new aircraft or in existing aircraft gear wheels without modification to or replacement of existing landing gear components to produce a self-propelled drive wheel that can efficiently move an aircraft on the ground without reliance on the aircraft's main engines or external tow vehicles.

Figure 1:
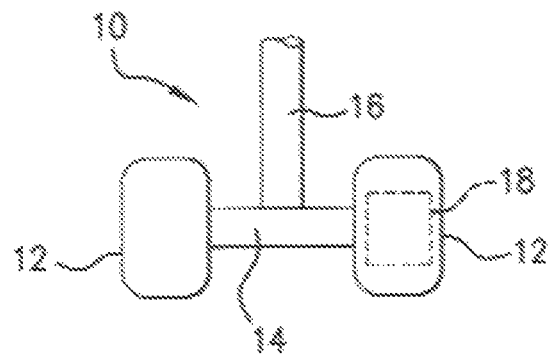
FIG. 1 is a schematic view of an aircraft landing gear assembly showing one possible location of the drive system with harmonic drive in accordance with the present invention.

Referring to the drawings, FIG. 1 illustrates, in schematic view, an aircraft landing gear 10. This landing gear, which can be a nose landing gear or a main landing gear, has two wheels 12 rotatably mounted on an axle 14 that is mounted on a strut structure 16 attached to the aircraft landing gear bay (not shown). One or more drive systems with harmonic drive according to the present invention are mounted on the axle 14, preferably to fit completely within the boundaries of the wheel 12. Other locations for the drive system, such as inboard or outboard of the aircraft wheel are also contemplated to be within the scope of the present invention. One drive system 18 is shown in FIG. 1. A second drive system (not shown) could also be mounted on the other wheel 12. The drive system of the present invention employs harmonic drive, as will be described below, to drive a motor to move the aircraft wheel and the aircraft on the ground independently of the aircraft's engines or tow vehicles.

Harmonic drive, also known as strain wave gearing, is based on elastic dynamics and uses the flexibility of metal to form components that combine to improve characteristics of traditional gearing systems. For example, backlash is eliminated, high gear ratios and torque can be achieved, and compact, lightweight systems can be produced. Other advantages of harmonic drive can include reconfigured gear ratios within a standard housing, good resolution and repeatability when repositioning inertial loads, and coaxial input and output shafts. Moreover, high gear reduction ratios are possible within a small volume. In the same volume where planetary gears produce a 10:1 ratio, a harmonic drive can produce a 100:1 ratio.

A harmonic drive assembly generally has three main elements: a wave generator, a flex spline, and a circular spline. Variations on these elements are possible and are intended to be within the scope of the present invention. Some of the variations are shown and described below. The splines include teeth positioned circumferentially so that the teeth of the circular spline and the teeth of the flex spline mesh during rotation. The flex spline typically has en elliptical shape, which causes its teeth to mesh with the circular spline teeth in only two regions along the major axis of the ellipse. As the wave generator or other input rotates, the flex spline teeth that are meshed with the circular spline change. The major axis of the flex spline rotates with the wave generator. Because the flex spline normally has fewer teeth than the circular spline, for every full rotation of the wave generator, the flex spline is caused to rotate a small distance backward relative to the circular spline. Consequently, the rotation of the wave generator produces a much slower rotation of the flex spline in the opposite direction.

The gearing reduction ratio for a harmonic drive can be calculated from the number of teeth on each gear:

$$\text{Reduction ratio} = \frac{\text{Flex spline teeth} - \text{Circular spline teeth}}{\text{Flex spline teeth}}$$

If there are 202 teeth on the circular spline and 200 on the flex spline, for example, the reduction ratio is (200−202)/200=−0.01. The flex spline rotates at 1/100 of the speed of the wave generator and in the opposite direction, which permits different reduction ratios to be set without changing the shape, increasing the weight, or adding stages to the harmonic drive. The range of possible gear ratios is only limited by teeth size limits for a given design. The desired results can be achieved with a difference of at least two teeth between the flex spline and the circular spline. Greater tooth number differences can also be used, however. Effective drive results have been achieved with a difference of five teeth, for example.

Figure 2:
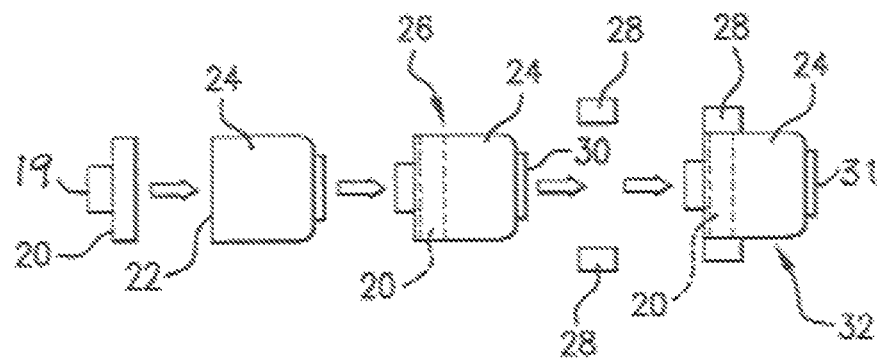
FIG. 2 is a side schematic view of one type of harmonic drive assembly useful with the aircraft wheel drive system of the present invention.
Figure 3:
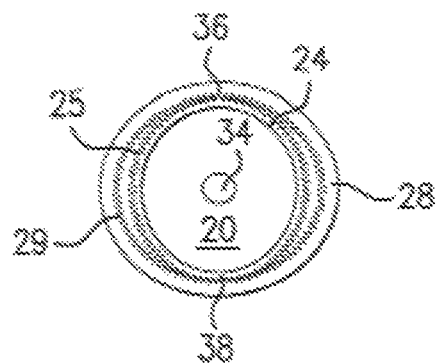
FIG. 3 is a cross-sectional view of the harmonic drive assembly shown in FIG. 2.

FIGS. 2 and 3 show one possible design for a harmonic drive arrangement useful with the drive system of the present invention. In the cup-style harmonic drive gear shown, a wave generator 20 is positioned on an input shaft 19 into an open end 22 of a cup-shaped flex spline 24 to form the partial assembly shown at 26 in FIG. 2. A circular spline 28 is positioned over the flex spline 24 so that it is adjacent to the flex spline open end 22 and the wave generator 20 to form the complete harmonic drive assembly 32. An output shaft 31 will project from end 30 of the flex spline 24. The entire harmonic drive assembly is rotatably and concentrically mounted on a shaft 34 that includes the input shaft 19 and the output shaft 31, as shown in FIG. 3. FIG. 3 additionally shows the teeth 25 arranged around the outer circumferential surface of the flex spline 24 and teeth 29 arranged around the inner circumferential surface of the circular spline 28. As discussed above, the flex spline 24 actually has an elliptical configuration so that it meshes with the circular spline 28 only at opposed regions 36 and 38, which lie on the major axis of the ellipse. The flex spline 24 has at least two fewer teeth than the circular spline 28, which causes the flex spline 24 to rotate more slowly and in the opposite direction from the rotating wave generator 20 when the harmonic drive is operating. Although a cup-shaped flex spline 24 is shown, other flex spline designs can be used effectively and are contemplated to be within the scope of the present invention.

Figure 4:
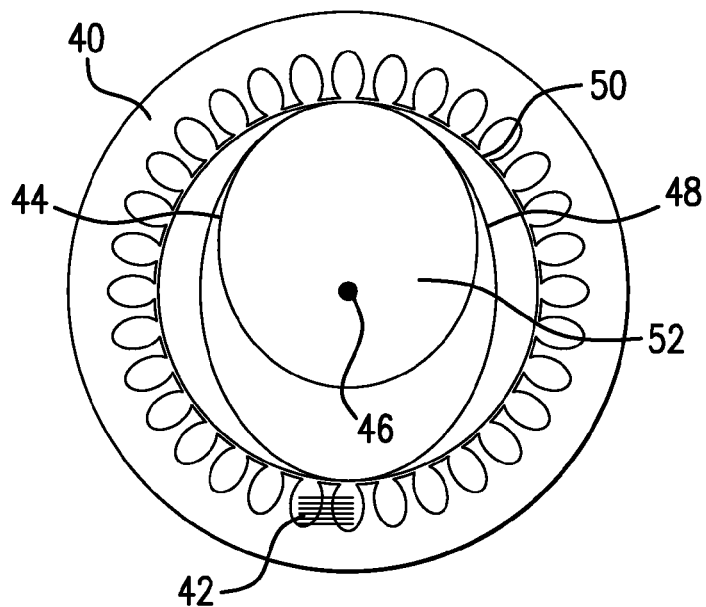
FIG. 4 is a schematic cross-sectional view of a motor with a second type of harmonic drive arrangement useful with the aircraft wheel drive system of the present invention.

FIG. 4 illustrates a second possible arrangement of a drive system with a harmonic drive in accordance with the present invention. This drive system includes a motor with a stator 40, preferably with a magnetic core and magnetic windings 42, only one of which is shown for clarity. The motor has a cylindrical internal cavity in which is mounted a rotor 44 on a shaft 46 eccentrically with respect to the stator 40. The rotor 44 could also be mounted concentrically with respect to the stator 40. A flex spline 48 is concentrically mounted within the stator 40 and coupled both to the rotor 44 and to the shaft 46. The stator 40 functions as the circular spline 28 in FIGS. 2 and 3. The stator 40 has teeth (not shown) on its inner circumference 50, and the flex spline 48 has teeth (not shown) on its outer circumference in a similar arrangement as that shown in FIG. 3. The stator 40 performs the same function as the circular spline of FIGS. 2 and 3. A wave generator 52 is concentric with the rotor 44.

Preferably, the flex spline 48 is made from flexible, non-magnetic material, such as, for example spring temper steel. Alternatively, the flex spline teeth could be made from individual pieces of rigid metal, such as, for example, hardened steel attached to a flexible spline. As in the FIGS. 2 and 3 embodiment, the number of teeth on the flex spline 48 is at least two less than the number of teeth on the stator 40. A larger difference could be required for optimal operation in different applications.

In operation, the stator 40 is magnetized to cause the rotor 44 to be pulled around the internal cavity of the stator, eccentrically oscillating at high frequency and rotating. Since the rotor 44 is coupled to the flex spline 48, the flex spline rotates with the rotor, but flexes to accommodate the eccentric oscillation of the rotor so that only the rotation is transmitted by the flex spline 48 to the shaft 46. In this arrangement, the motor and gearing are integrally combined in the harmonic drive assembly.

Figure 5:
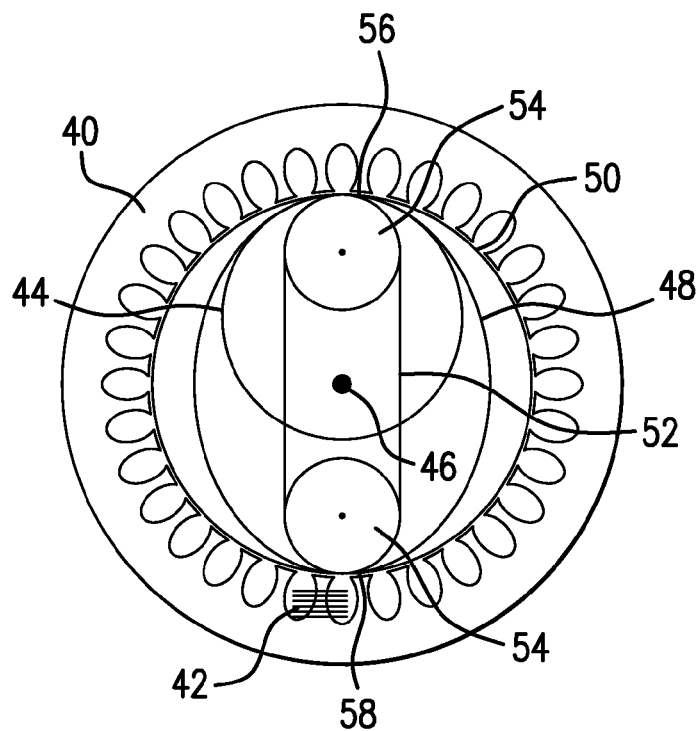
FIG. 5 is a schematic cross-sectional view of a motor with a third type of harmonic drive arrangement useful with the aircraft wheel drive system of the present invention.

FIG. 5 shows a third possible arrangement of a drive motor and harmonic drive according to the present invention. A stator 40, preferably with a magnetic core, performs the same function as a circular spline and has magnetic windings 42, only one of which is shown and a cylindrical internal cavity as in FIG. 4. A rotor 44 is eccentrically mounted inside the stator 40, and a flex spline 48 is concentrically mounted inside the stator 40 and coupled to a shaft 46, which is an output shaft.

The rotor 44 could also be concentrically mounted with respect to the stator 40. A wave generator 52 is rotatably mounted on the shaft 46 and positioned inside the flex spline 48. The wave generator 52 is a linear shaft with a pair of rollers 54 made of magnetic material, one roller being positioned at each end, as shown. The rollers 54 force the flex spline 48 into contact with the internal surface 50 of the stator 40 at two opposite points, such as points 56 and 58 shown in FIG. 5, that are 180 degrees apart. The outer surface of the flex spline 48 and the inner surface of the stator 40 have teeth (not shown) so that the flex spline engages the stator at these two points. The flex spline 48 has at least two fewer teeth than the stator 40, although this number can be even larger, depending on the drive system application.

During operation, pairs of opposite sections of the stator 40 are magnetized together in a periodic cycle. As an example, in a 12 pole stator, the windings at 0 and 180 degrees are magnetized, then the windings at 30 and 210 degrees, then the windings at 60 and 240 degrees, then at 90 and 270 degrees, and so on around the circumference of the stator. The wave generator 52 is pulled around by this moving magnetic field and, as the rollers 54 roll without slipping along the inside surface of the flex spline 48, the two contact points between the flex spline 48 and the stator 40 rotate with the wave generator 52. Therefore, the flex spline 48 is continually distorted by the rotating, high frequency wave generator 52, but the overall rotation of the flex spline is slow. Since the rotation of the flex spline 48 is coupled to the shaft 46, only the slow rotation of the flex spline is transmitted to the shaft 46. An advantage of this arrangement is that the flex spline 48 is distorted by the wave generator 52, and no magnetic force is lost in distorting the flex spline. An additional advantage is that the flex spline is oscillating at high speed without rotating at high speed.

Virtually any type of electric motor known in the art that is capable of generating the high torque required and is sufficiently compact to fit within the available space within an aircraft wheel could be used to power the drive system with harmonic drive of the present invention. Examples of suitable electric motors include, but are not limited to, induction type motors, high phase order motors, permanent magnet motors, switched reluctance motors, toroidally wound motors, and the like. Specific examples of electric drive motors that can be used in connection with the present invention are illustrated in U.S. Pat. Nos. 6,657,334; 6,837,791; 7,116,019; 7,469,858, the disclosures of which are incorporated herein by reference. The foregoing examples are not intended to be limiting.

While the harmonic drive assemblies described above have been described and shown with motor assemblies that include a rotor located internally of a stator and mounted eccentrically with respect to the stator, motor assemblies with a rotor mounted concentrically with respect to a stator and motor assemblies with a rotor mounted externally of a stator are also contemplated to be within the scope of the present invention. Other possible variations and combinations of motor elements and harmonic drive elements are also intended to fall within the scope of the present invention.

The effectiveness and efficiency of the electric drive motors described above in an in-wheel aircraft environment is enhanced by combining a high powered motor with a harmonic drive assembly. A combination of a motor assembly and a harmonic drive can be more space efficient and can produce more useful output power, torque, and speed than can a motor with traditional gearing. The drive system of the present invention further overcomes the challenges encountered when conventional gearing is combined with electric motors requiring the location of both the gears and motor components on or near the outside of the wheel rim to generate effective torques and then transfer these torques to the wheel. The drive system of the present invention is a compact assembly that combines the motor elements and harmonic drive elements in a smaller volume than is possible for motors with traditional gearing. This compact assembly can fit comfortably within the volume available in an aircraft wheel. As discussed above, high gear ratios and gear reduction ratios are possible with this compact structure. The range of possible gear ratios tends to be limited primarily by the teeth size for a given motor and harmonic drive configuration.

A preferred use of the drive system with harmonic drive of the present invention is to produce the output power, torque, and speed required to drive one or more aircraft wheels to move an aircraft on the ground without using engines or tow vehicles. The compact configuration possible for the present system makes it especially suited to this application since space within an aircraft landing gear wheel well is at a premium. The present drive system with harmonic drive can be installed on either nose wheels or main wheels. A significant advantage of the design of the drive system with harmonic drive of the present invention is achieved when this system is installed in an existing aircraft. The installation of the present drive system permits the continued use of an aircraft's existing tires, axle, and piston that are already in use on the aircraft. Since these structures are not altered from their original condition or otherwise changed in any way by the installation of the present motor and gearing system, the rim width, tire bead, and bead seat would not require recertification by the FAA or other authorities, thus eliminating a potentially lengthy and costly process.

The drive system, including the electric motor and harmonic drive described herein has been described with respect to preferred embodiments. This is not intended to be limiting and other, equivalent, structures and arrangements that perform the required functions are also contemplated to be within the scope of the present invention.

INDUSTRIAL APPLICABILITY

The drive system with harmonic drive of the present invention will find its primary applicability and use in aircraft nose wheels and main wheels in which a drive system capable of generating the torque and power required to drive the aircraft on the ground must be operationally configured to fit into the small space available within a wheel. The drive system of the present invention is also particularly well-suited to be retrofitted in nose or main wheels in existing aircraft.

The invention claimed is:

1. A compact drive system for installation completely within an aircraft nose or main landing gear wheel to drive the aircraft on the ground independently of the aircraft's engines or tow vehicles, comprising:
   a. an electric motor assembly comprising at least a stationary stator element and a rotatable rotor element adapted to produce torque required to drive one or more aircraft landing gear wheels and drive an aircraft independently on the ground; and
   b. a harmonic drive assembly mounted integrally with the electric motor to drive said electric motor, comprising at least a wave generator element, a toothed flex spline element, and a toothed circular spline element rotatably and concentrically mounted for rotation on a shaft comprising an input shaft coaxial with an output shaft and adapted to produce a desired gear reduction ratio during operation of said electric motor assembly and said harmonic drive assembly to drive said aircraft, wherein the electric motor assembly and the harmonic drive assembly are integrally configured and sized to fit completely and operationally within space defined by interior structures of an aircraft nose or main landing gear wheel, wherein said stator element comprises said toothed circular spline element; and
   said toothed flex spline element has an elliptical configuration during rotation, and wherein selected ones of a plurality of teeth on said toothed flex spline element mesh with corresponding teeth on said circular spline element at opposed points 180 degrees apart along a major axis of the elliptical toothed flex spline element.

2. The compact drive system of claim 1, wherein said rotor element is located internally of said stator element, said wave generator element is positioned within said toothed flex spline element, and said toothed circular spline element is positioned outwardly of said flex spline element so that teeth on said flex spline element and teeth on said circular spline element mesh during rotation.

3. The compact drive system of claim 1, wherein said flex spline element has a cup-shaped configuration with an open end, said wave generator element is positioned within said open end, and said toothed circular spline element is positioned outwardly of said wave generator element with said toothed flex spline element disposed therebetween.

4. The compact drive system of claim 1, wherein said harmonic drive assembly comprises said wave generator element mounted to input rotation to said harmonic drive assembly, said toothed flex spline formed with a plurality of teeth on an outer circumferential surface and positioned to mesh with a plurality of corresponding teeth on an inner circumferential surface of said toothed circular spline element, and a number of the plurality of teeth on said toothed flex spline element is less than a number of the plurality of teeth on said toothed circular spline element so that rotation of said wave generator element causes said toothed flex spline element to rotate more slowly than said wave generator element and in an opposite direction from the direction of rotation of said wave generator element.

5. The compact drive system of claim 1, wherein an inner circumferential surface of said toothed circular spline element and an outer circumferential surface of said toothed flex spline element each comprise a plurality of teeth spaced and configured to mesh when said toothed circular spline element and said toothed flex spline element rotate about said shaft, wherein said toothed flex spline element has fewer teeth than said toothed circular spline element.

6. The compact drive system of claim 1, wherein said rotor element is mounted eccentrically with respect to said stator element and said toothed flex spline element or concentrically with respect to said stator element and said toothed flex spline element.

7. The compact drive system of claim 1, wherein said toothed flex spline element is made entirely from a flexible non-magnetic material or from a flexible non-magnetic material supporting teeth made from a rigid material.

8. The compact drive system of claim 2, wherein said rotor element, said wave generator element, said toothed flex spline element, and said toothed circular spline element are concentrically rotatably mounted between the input shaft and the output shaft.

9. The compact drive system of claim 8, wherein an inner circumferential surface of said stator element and an outer circumferential surface of said toothed flex spline element each include comprise a plurality of teeth spaced and configured to mesh when said rotor element and said toothed flex spline element rotate about said shaft, wherein said toothed flex spline element has fewer teeth than said stator element.

10. The compact drive system of claim 8, wherein said rotor element is mounted eccentrically with respect to said stator element and said toothed flex spline element.

11. The compact drive system of claim 9, wherein a number of teeth on said toothed flex spline element is at least two less than a number of teeth on said toothed circular spline element.

12. The compact drive system of claim 4, wherein said electric motor assembly comprises an electric motor selected from the group comprising induction type motors, high phase order motors, permanent magnet motors, switched reluctance motors, and toroidally wound motors.

13. The compact drive system of claim 5, wherein said toothed flex spline element has an elliptical configuration during rotation about the shaft, and wherein selected ones of the plurality of teeth of said toothed flex spline element mesh with corresponding teeth of said toothed circular spline element at opposed points 180 degrees apart along a major axis of the elliptical toothed flex spline element.

14. The compact drive system of claim 5, wherein a number of teeth on said toothed flex spline element is at least two less than a number of teeth on said toothed circular spline element.

15. The compact drive system of claim 5, wherein a difference in numbers or sizes of teeth between said toothed flex spline element and said toothed circular spline element is selected to produce a desired gear reduction ratio for the drive system.

16. A drive system designed to be installed completely within one or more aircraft landing gear wheels to drive the aircraft independently on the ground, comprising:
  a. a motor assembly adapted to provide power to drive an aircraft wheel to move an aircraft on the ground comprising a rotor located internally of a stator; and
  b. a harmonic drive assembly adapted to drive the motor assembly positioned integrally with the motor assembly in one or more aircraft landing gear wheels, comprising a wave generator positioned within a toothed flex spline and a toothed circular spline positioned outwardly of said toothed flex spline, wherein said wave generator, said toothed flex spline, and said toothed circular spline are concentrically mounted for rotation on a shaft comprising a coaxial input and output, said toothed flex spline has an elliptical configuration during rotation about the shaft, and teeth of said toothed flex spline mesh with corresponding teeth of said toothed circular spline at opposed points 180 degrees apart along a major axis of the elliptical toothed flex spline, and wherein said motor assembly and said harmonic drive assembly are configured and sized to fit completely within an interior space defined in the aircraft wheel.

\* \* \* \* \*